March 16, 1937.  J. M. WILKINS  2,074,292
RELIEF VALVE
Filed April 26, 1934
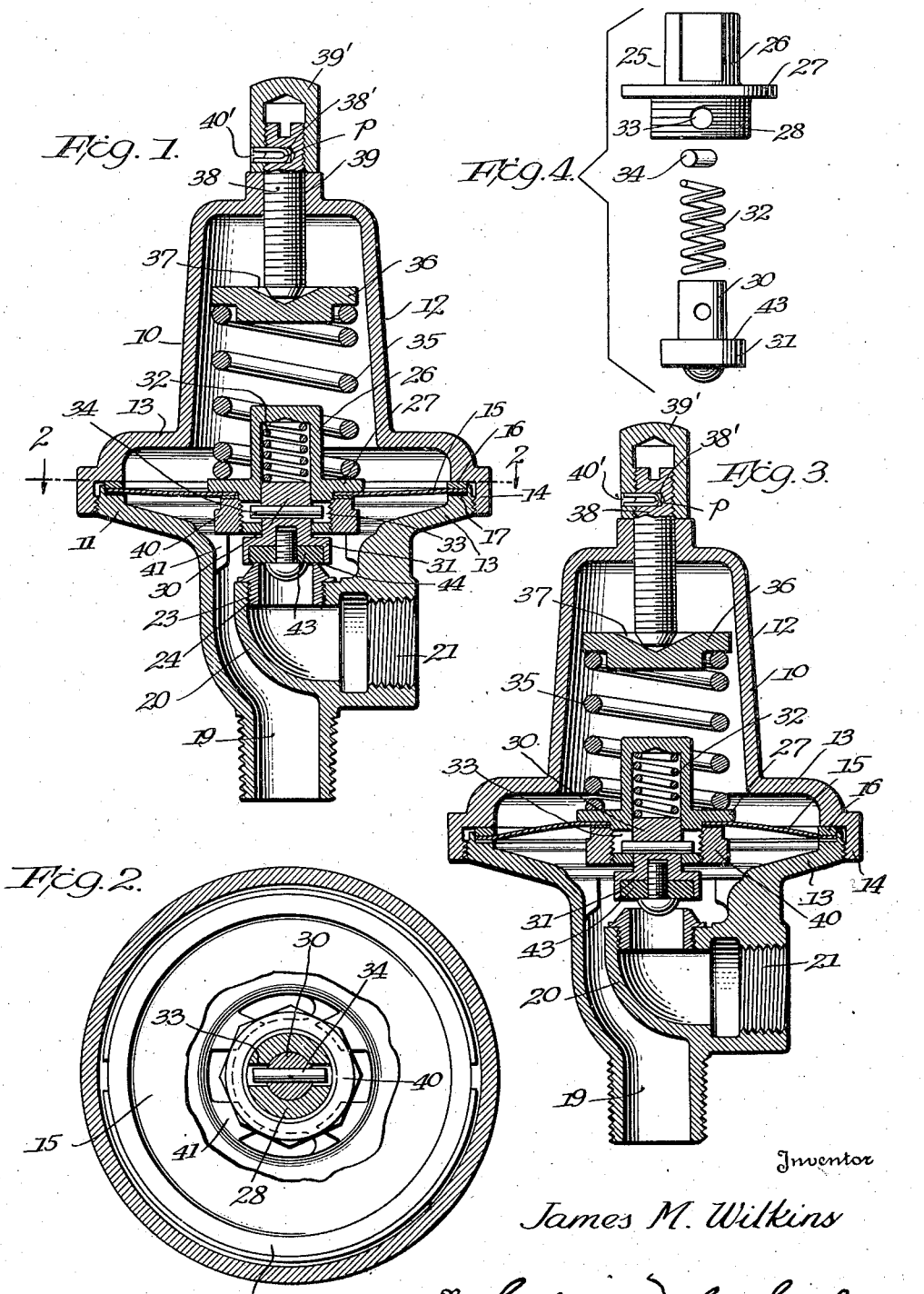
Inventor
James M. Wilkins Patented Mar. 16, 1937

2,074,292

UNITED STATES PATENT OFFICE 2,074,292

RELIEF VALVE

James M. Wilkins, Decatur, Ill., assignor to Mueller Co., Decatur, Ill., a corporation of Illinois Application April 26, 1934, Serial No. 722,577

3 Claims. (Cl. 137—53)

The present invention relates to relief valves, and, particularly, a valve adapted for use in a fluid line to relieve the same upon the occurrence of excessive pressure, and has for its objects to provide a high pressure relief valve which, although held on its seat by a relatively heavy spring, will not be injured by constant pressure; which is of compact construction, and the cooperating elements of which are so disposed and balanced that wear will be evenly distributed and the valve will operate efficiently for an indefinite period of time.

In the drawing herewith is shown one form of the invention, but it will be understood that the drawing is illustrative and in no sense restrictive, as the invention may be developed in various mechanical ways.

Figure 1 is a vertical sectional view through the center of the valve, showing the valve in its closed position;

Figure 2 is a horizontal sectional view taken along the line 2—2 of Figure 1;

Figure 3 is a vertical sectional view similar to Figure 1 but showing the valve in its open position; and Figure 4 shows the details of the valve and the guiding element which carries the same.

Referring to the drawing by numerals, like numerals designating like parts throughout the several views, 10 indicates the valve casing, said casing comprising a body member 11 and a bonnet 12. The body member and bonnet are provided with sharp outwardly flaring portions 13, and the bonnet has integral therewith a downwardly extending interiorly screw threaded flange 14 which embraces and is threaded to the perimeter of the flared portion 13 of the body member. Carried between the body member and bonnet is a flexible diaphragm 15, said diaphragm being preferably composed of a plurality of thin layers of copper, or the like. The diaphragm divides the interior of the casing into a bonnet chamber and a body member chamber. A metallic retaining ring 16 is disposed between the bonnet and the diaphragm and a soft washer 17 is disposed between the body member and the diaphragm, in order that a fluid-tight seal may be formed when the bonnet is screwed tightly onto the body member. The diaphragm carries the valve mechanism, as will be hereinafter described.

The lower end of the body member merges into a circular screw threaded extension 19 which forms the lower end of the inlet passage, said extension being exteriorly screw threaded or suitably fitted for attachment to the fluid line or container in which pressure relief is desired.

The body member is provided with an integral outlet passage 20 which is substantially surrounded by the inlet passage, said passage being interiorly screw threaded as shown at 21, or otherwise fitted for connection with an exhaust line or the like. The upper end of the passage 20 is screw threaded as at 23 for the reception of the valve seat member 24, which constitutes a fluid-way between the body member chamber and the outlet.

The diaphragm 15 is recessed at its center to carry the valve mechanism, the details of which are shown in Figure 4. The valve mechanism includes a central valve guiding element 25, said element including a hollow cup-shaped sleeve 26 extending above the diaphragm, a flanged portion 27 which abuts the upper surface of the diaphragm, and a continuation 28 of sleeve 26 which passes through the diaphragm and extends into the body member. The valve guiding member is adapted to receive therein an upwardly extending stem 30 of a valve 31, said stem having a sliding fit within sleeve 26.

It will be noted that the diameter of the valve stem 30 and the interior diameter of the sleeve 28 and 26 is substantially as great as the diameter of the fluid-way in the valve seat 24. This arrangement is important, in that it insures a firm and even guiding of the valve onto its seat to prevent uneven wear of the valve seating surface, as will be hereinafter described.

A secondary spring 32 is enclosed within the sleeve 26 between the inner end wall thereof and the upper end of the stem 30, said spring serving to press the valve to its seat when the fluid pressure in the line is normal. By arranging the spring in this manner, it will be seen that, although the spring is in the fluid side of the diaphragm, yet it is above the same, thus permitting material shortening of the valve body. The lower sleeve portion 28 is provided with a pair of diametrically opposed apertures 33, said apertures being adapted to receive the ends of a pin 34 which is rigidly held within an aperture through the valve stem 30. It will be noted that the apertures 33 are of considerably greater diameter than the diameter of the pin 34, this arrangement serving to permit longitudinal sliding movement of the valve stem 30 within the sleeve 28 and 26. While the apertures 33 are shown as being circular, it is obvious that these apertures may be elongated vertically, and in either case, the cooperation of the apertures 33 with the pin 34 permits longitudinal movement of the valve stem 30 within the sleeve, while at the same time, the cooperation of these elements prevents relative rotation between the valve stem and the sleeve. For this reason, when the valve is seated, there will be no tendency for the valve to be rotated upon its seat.

A relatively heavy loading spring 35 is concentric with and encloses the sleeve 26, said spring bearing, at its lower end, upon the upper surface of the flange 27 of the guiding element, the upper end of said spring being retained by the follower 36. The follower is recessed centrally of its upper surface at 37, and the end of an adjusting screw 38 engages the follower within this recess. The adjusting screw is threaded within the upper end of the bonnet at 39, so that the tension of the loading spring may be adjusted in the well known manner.

A cap 39' is placed over the head of the adjusting screw 38 after the screw has been adjusted for the proper pressure, the lower end of the cap abutting against the upper end of the valve casing. Aligned holes 38' and 40' are bored into the adjusting screw and cap, respectively. A cotter pin p is inserted into the apertures 40' and 38' to secure the cap to the adjusting screw, and to prevent setting up on the adjusting screw to increase the tension on the loading spring 35, and thus raise the pressure limit at which the valve relieves. However, it will be noted that the provision of the cap 39' does not prevent the unscrewing of the adjusted screw 38 in order to relieve the pressure of the loading spring and thus lower the pressure limit at which the valve exhausts.

The valve mechanism is secured to the diaphragm by means of the retaining nut 40 which is threaded exteriorly of the lower sleeve portion 28, so that when nut 40 is tightened, the diaphragm is gripped between the nut and the flange 27.

A number of spaced stop lugs 41 are provided on the inner surface of the body member at the inner end of the inlet passage, said lugs being circularly disposed around the valve and the valve seat. By reason of the spacing of stop lugs 41, the fluid from the inlet 19 may pass between them to the lower surface of the diaphragm. Furthermore, by reason of the disposition of the stop lugs 41 in the inlet passage, the rush of fluid past the same when the valve is actuated will keep the engaging faces of the lugs clean, thus insuring even engagement of said lugs with the retaining nut 40. When the diaphragm is moved downwardly under pressure of the loading spring 35, the lower surface of the retaining nut 40 will engage the stop lugs 41 to limit the movement of the diaphragm, and provide a firm central support for the same. That is, at normal fluid pressure, the diaphragm is supported in relieved position as shown in Figure 1, and there is thus no tendency for the diaphragm to become disrupted with consequent leakage.

Furthermore, as will be noted in Figure 1, when the fluid pressure is normal, and the loading spring has moved the diaphragm until the retaining nut 40 engages the stop lugs 41, the pin 34 is substantially centrally located within the circular or elongated apertures 33, so that the valve 31 is pressed upon its seat solely by the pressure of the secondary spring 32, rather than being jammed thereon by the force of the heavy spring 35.

This arrangement is desirable, when it is considered that the valve is usually provided with an insert of relatively soft material 43 where it engages the valve seat, in order to make a tight fluid pressure seal. In relief valves which are arranged to operate at high pressure, it is essential that a suitably powerful loading spring be provided, and it is obvious that the pressure of such a loading spring would not only tend to rupture the diaphragm, but would also injure the soft insert of the valve by forcing it with too great pressure against its seat. Therefore, the above described construction is admirably suited for relief valves of this character, in that rupture of the diaphragm and injury to the valve insert is prevented without impairing the operating efficiency of the valve.

It will be observed that, by reason of the sharp flare 13 of the body member and bonnet, a relatively large diaphragm area results. Conversely, it will be noted that the upper surface of the valve 31 as at 43 (Figure 4) is relatively small. In addition, the lower surface of the valve which extends out over the valve seat as at 44 (Figure 1) presents a pressure area which tends to counteract the downward pressure on the upper surface of the valve. By providing a relatively large diaphragm pressure area coupled with an almost negligible downward pressure area on the upper surface of the valve, little fluid pressure resistance is offered when the diaphragm is actuated by excessive pressure to lift the valve from the seat. Such a construction avoids the necessity of providing additional mechanical means for accelerating the upward movement of the diaphragm when the critical point is reached, i. e., the point when the diaphragm is just about to lift the valve from its seat. At this point, it has been found that the tendency of the valve to stick to its seat, coupled with downward fluid pressure on the valve, often delays relief until the "set" pressure is exceeded.

In operation, the valve will be connected into the fluid line, and fluid will flow from said line and pass through the inlet 19 up through the body member and between the lugs 41 to the lower surface of the diaphragm. At normal fluid pressure, the loading spring 35 will hold the diaphragm in closed position with the retaining nut 40 resting upon the lugs 41. When the valve is in this position, as stated above, it will be held upon its seat solely by the pressure of the secondary spring 32, and the valve will not be lifted from its seat by minor fluctuations of pressure. That is, a sudden excess of pressure which immediately fails could raise the diaphragm against the pressure of the loading spring 35 for a short distance, thus decreasing the force exerted by spring 32, without lifting the valve from its seat, it being obvious that the secondary spring 32 will retain the valve on its seat until the lower surfaces of the apertures 33 engage the pin 34.

However, when an excessive and sustained pressure arises in the fluid line, it will lift the diaphragm until the lower surfaces of the apertures 33 engage the pin 34, and if this pressure exceeds the predetermined pressure for which the loading spring 35 is set, further upward movement will carry the valve stem 30 and thus lift valve 31 from its seat. In Figure 3, the diaphragm is shown lifted against the pressure of the loading spring, and it will be observed that the fluid will vent through the fluid-way provided by the valve seat 24 and out through the outlet 21.

When sufficient fluid has vented through the outlet 21 to relieve the dangerous pressure condition, the force exerted by the loading spring upon the upper surface of the diaphragm will exceed the fluid pressure below the diaphragm, and the diaphragm will move downwardly. As the diaphragm moves downwardly, the valve will engage its seat and the impact of this engagement will be cushioned by the compression of the secondary spring 32. Further downward movement will then result in the locking nut 40 engaging the lugs 41, at which time the diaphragm will be at rest position as in Figure 1, and reset for further operation. It will be noted that, by reason of the provision of the secondary spring 32 and the sliding fit of the valve stem within the guiding element, the valve will not be driven upon its seat by the heavy pressure of the loading spring. Furthermore, the sliding fit of the valve stem within the guiding sleeve assures that the valve will properly contact with its seat. Proper contact or seating of the valve is extremely important since it has been found that uneven wear of the packing insert results when the mechanism is of such construction that lateral movement of the valve with respect to its seat can occur. This is due to the fact that after such actuation, the valve may be reseated in a different position.

This uneven wear results in high pressure fluid seeping through the valve when it is seated, thus resulting in undesirable loss of pressure and in a tendency for the high pressure to rotate the valve upon its seat. It will be further noted that, by reason of the cooperation of the pin 34 within the apertures 33, any such rotation is prevented.

Such departure from the construction here disclosed as amounts only to mechanical skill may be made without departing from the range of the invention.

I claim:—

1. A relief valve comprising a casing, a diaphragm, a loading spring between one end of said casing and said diaphragm, inlet and outlet passages in the opposite end of said casing, said inlet passage substantially surrounding said outlet passage, said outlet passage including a valve seat, diaphragm arresting means on said casing around said valve seat and in said inlet passage, a valve for said outlet passage, said valve being carried by and adapted to have movement with respect to said diaphragm, means carried by said diaphragm to engage said arresting means to limit movement of the diaphragm under pressure of said loading spring, and means within said loading spring and carried by said diaphragm for maintaining said valve on its seat when movement of the diaphragm is arrested.

2. A relief valve comprising a body member and a bonnet member, a flexible diaphragm between said members forming with them respectively a body chamber and a bonnet chamber, a loading spring between said bonnet member and said diaphragm, inlet and outlet passages in said body member, said outlet passage including a valve seat, a valve member for said seat having a stem, a guiding sleeve for said stem included in said diaphragm, said sleeve extending into and being open at one end thereof to said body chamber to receive said valve stem and being closed at the other end thereof and having a flange engaging said diaphragm, said flange providing a seat for said loading spring, a secondary spring in said sleeve in engagement with the end of said valve stem to retain said valve on its seat during initial movements of said diaphragm, said sleeve extending into said bonnet chamber and said loading spring a distance substantially equal to the length of said valve member, cooperating means carried by said sleeve and said valve stem providing for longitudinal and preventing rotational movement of said valve with respect to said sleeve and said valve seat, a plurality of diaphragm stop lugs on the wall of said body chamber and spaced from said valve seat, the engaging surfaces of said lugs being in a plane parallel to the plane of said valve seat, and a nut threaded on the end of said guide sleeve which extends into said body chamber to clamp said diaphragm between said nut and the flange of said sleeve, said nut being adapted to engage said lugs and having its outer engaging face in a plane parallel to the plane of said valve seat and the engaging surfaces of said lugs.

3. A relief valve comprising a body member and a bonnet member, a flexible diaphragm between said members forming with them respectively, a body chamber and a bonnet chamber, a loading spring between said bonnet member and said diaphragm, inlet and outlet passages in said body member, said outlet passage including a valve seat, a valve member for said seat having a stem, a guiding sleeve for said stem included in said diaphragm, said sleeve extending into and being open at one end thereof to said body chamber to receive said valve stem and being closed at the other end thereof and having a flange engaging said diaphragm, a secondary spring in said sleeve in engagement with the end of said valve stem to retain said valve on its seat during initial movements of said diaphragm, said sleeve extending a substantial distance into said bonnet chamber and said loading spring, cooperating means carried by said sleeve and said valve stem providing for longitudinal and preventing rotational movement of said valve with respect to said sleeve and said valve seat, a plurality of diaphragm stop lugs on the wall of said body chamber and spaced from said valve seat, the engaging surfaces of said lugs being in a plane parallel to the plane of said valve seat, and a nut threaded on the end of said guide sleeve which extends into said body chamber to clamp said diaphragm between said nut and the flange of said sleeve.

JAMES M. WILKINS.